March 28, 1967  G. BARANY  3,311,526
APPARATUS FOR MAKING FILTERS
Original Filed Feb. 28, 1963  4 Sheets-Sheet 1

INVENTOR
GEORGE BARANY

BY *F.P.Keiper*

ATTORNEY

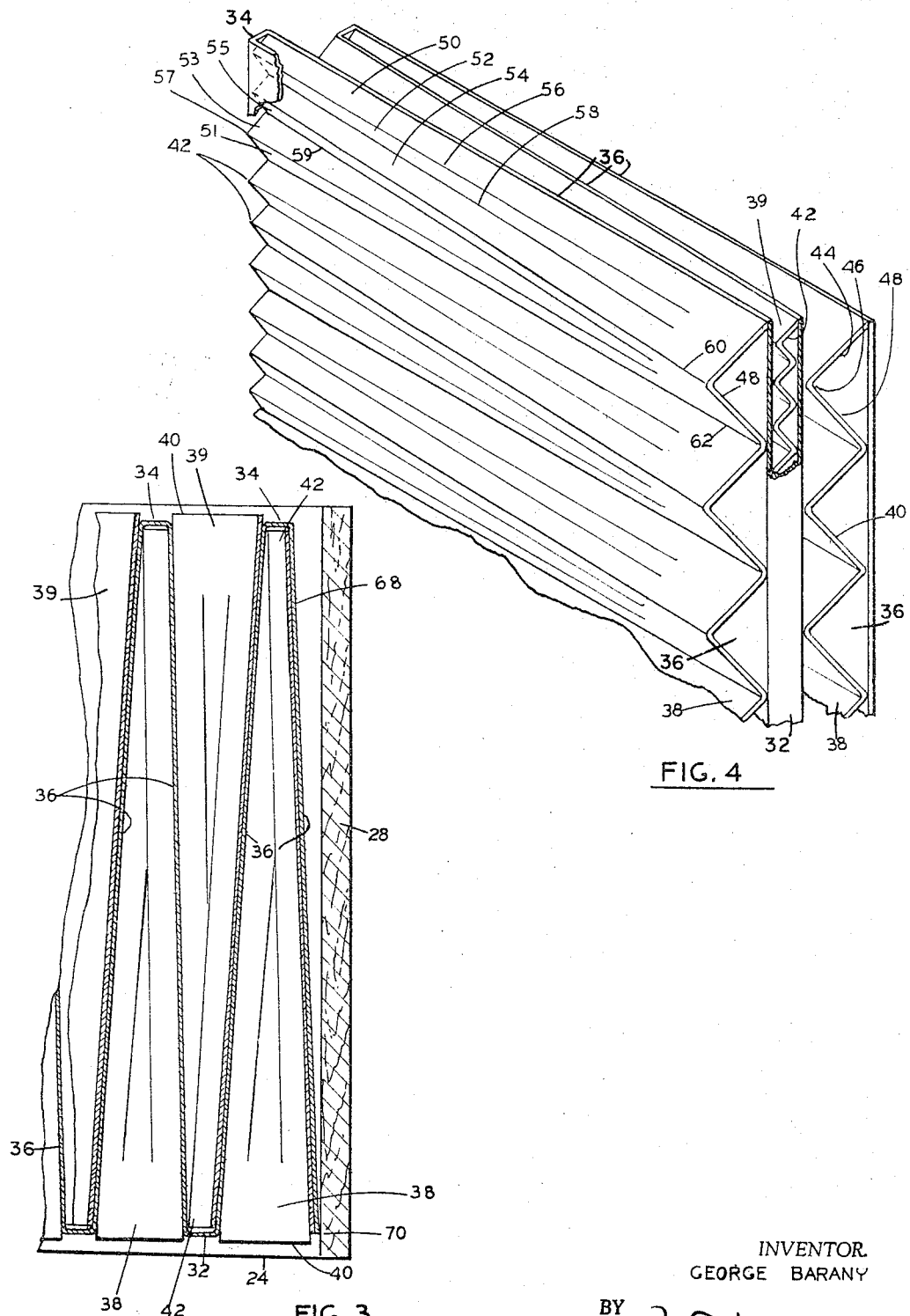

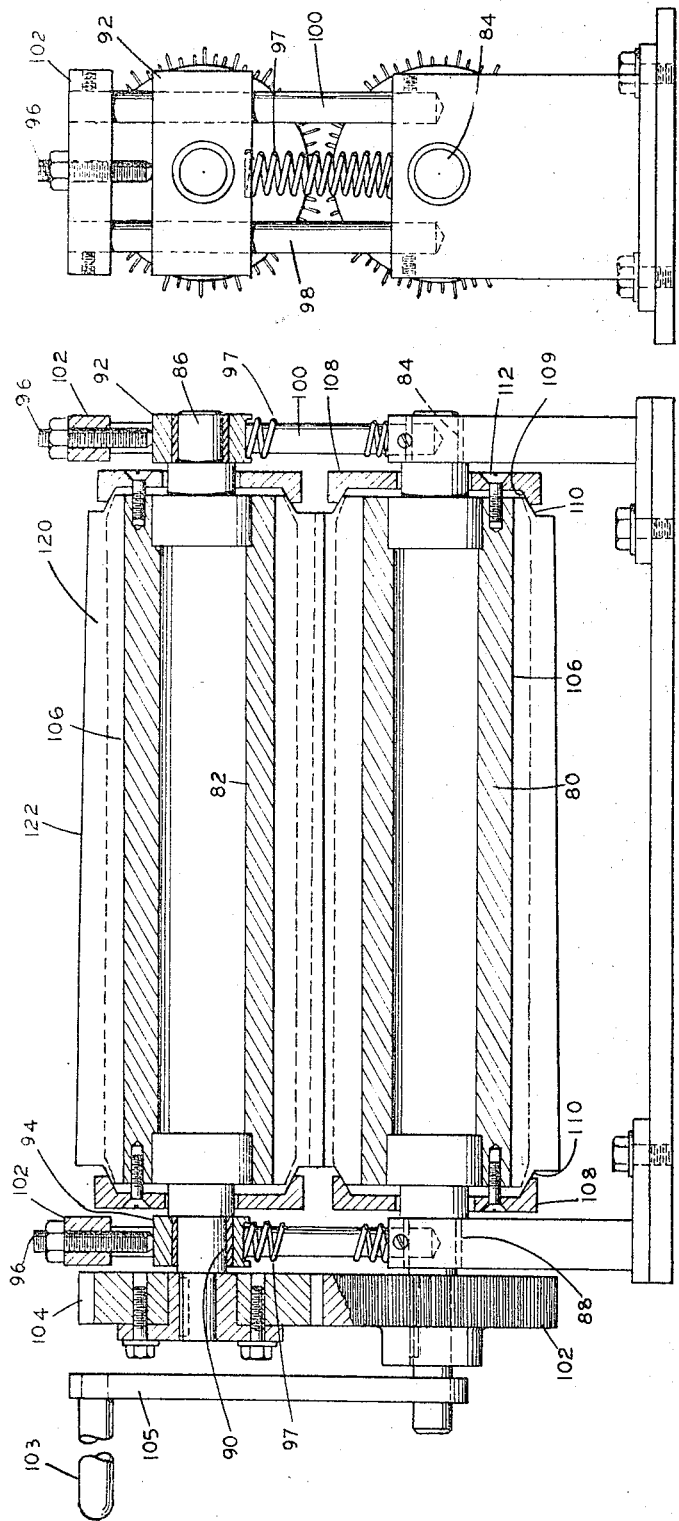

United States Patent Office 3,311,526
Patented Mar. 28, 1967

3,311,526
APPARATUS FOR MAKING FILTERS
George Barany, Syracuse, N.Y., assignor to Cambridge Filter Corporation, a corporation of New York
Original application Feb. 28, 1963, Ser. No. 261,632. Divided and this application May 14, 1965, Ser. No. 464,266
3 Claims. (Cl. 156—596)

This application is a division of application Serial No. 261,632 filed February 28, 1963.

This invention relates to apparatus for making filters of the high efficiency strainer type adapted to filter solid and liquid particles from gases and vapors, and wherein there is an extended area of filter media in closely pleated formation, the pleats of which are held in spaced relation by corrugated separators.

In filters of the type referred to, the corrugated separators provide channels for the gases or gaseous medium being filtered, to enter the filter from the upstream side, and for filtered gaseous medium to leave the filter from the downstream side, after passage through the filter media. The channels formed by the separator corrugations, in commercial practice, have been of uniform cross section and an example of such construction is shown in Baldwin Patent No. 2,884,091 issued April 28, 1959. It will be appreciated that gaseous medium entering the channels formed by the corrugated spacers is gradually dissipated through the filter media which in effect forms one wall of the channel passageways. Thus the velocity of the gaseous medium entering each channel gradually diminishes along the length of each channel from a maximum at the entrance, the velocity being zero at the blind end of each channel or passage. It will thus be apparent that it would be desirable to provide a separator having channels of reducing cross section to correspond with the gradually reducing amount of gas flowing in a channel. Thus as the distance from the open end of the channel increases, the resistance to flow is substantially uniform. By providing a gradually decreasing cross section of the channels, a greater number of pleats of filter media may be utilized in a given volume of filter, to lower the pressure differential across the filter media. On the other hand, the inlet ends of the channels may be made larger, utilizing the same amount of filter media, with a consequent reduction in resistance to gas flow within the channels, or a compromise between increasing the size of the inlet ends and the filter media area may be effected. In Root Patent No. 2,720,937, there is proposed the use of corrugated separators wherein the amplitude of the corrugations decreases from the open end to the closed end. However, such separators present difficult in the manufacture. If the amplitude decreases, there is a tendency for the pitch to increase, thus providing corrugations which fan out at their low amplitude ends, in a non-parallel manner. In addition the low amplitude of the corrugations, with long pitch may require material of increased rigidity to prevent the corrugations from flattening out, particularly on the downstream side where the adjacent flanks of each pleat fold tend to collapse against one another due to differential pressure. Furthermore, substantial areas of the filter media tend to be blocked off from active operation due to substantial contact of the media with the shallow amplitude ends of the separators, the area of such contact being increased by the effect of the pressure differential to which the filter media is subjected. Also the areas blocked off tend to increase as deposits occur, early in the life of the filter, and before the other areas have collected sufficient deposits to require replacement of the filter unit.

The present invention is directed to a filter wherein corrugated separators are employed, and in which the corrugations at the closed end are substantially increased in number, and of less pitch and correspondingly less amplitude than the corrugations at the open end. Thus the corrugations may be of approximately V formation with the angle between corrugation flanks approximately 90 degrees both at the open end and the closed end. Such corrugations, whether of small or large amplitude are capable of maintaining their shape against the differential pressures encountered and make only line contact with the media. Further such V formation with line contact permits a maximum build up of waste over the entire area of filter media without unduly reducing the passageway cross sections. The invention is further directed to a separator wherein each of the corrugations at the open end gradually transforms into a multiplicity of corrugations at the other end, the ratio preferably being 1 to 3, or a greater odd prime number ratio.

The invention further has to do with a filter construction employing such separators, as well as apparatus for economically producing the separators.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 3 is an enlarged fragmentary sectional view taken substantially on the line 3—3 of FIGURE 1;

FIGURE 4 is an enlarged fragmentary perspective view of several separators and pleats of filter media, as laid up in the preparation of a filter core, with portions of the filter media broken away;

FIGURE 5 is a side elevational view with parts in section of apparatus for forming the separators;

FIGURE 6 is an end elevational view of the forming apparatus;

Figure 1:
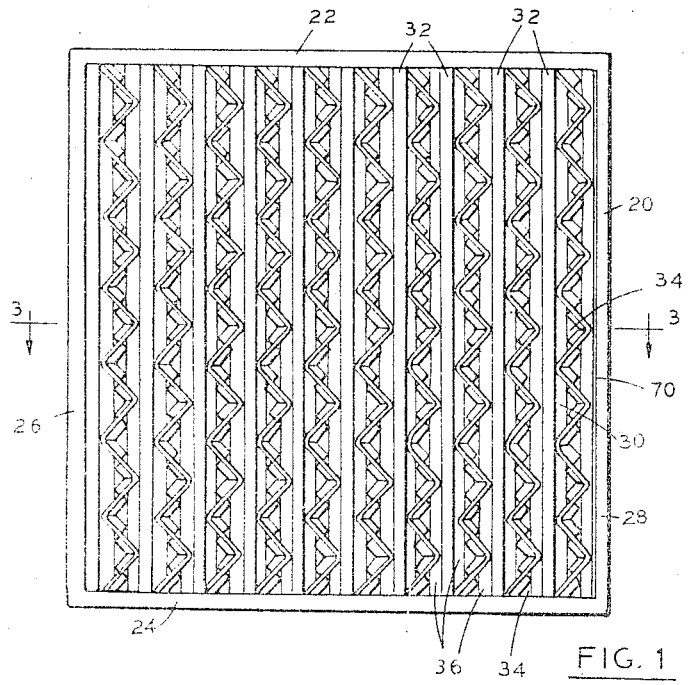
FIGURE 1 is an elevational view of a filter as seen from the upstream or downstream side, embodying the invention.
Figure 2:
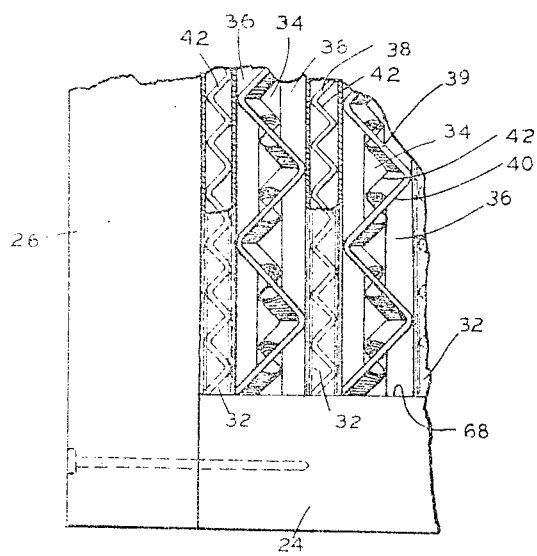
FIGURE 2 is an enlarged fragmentary detail view of FIGURE 1 with parts broken away.
Figure 7:
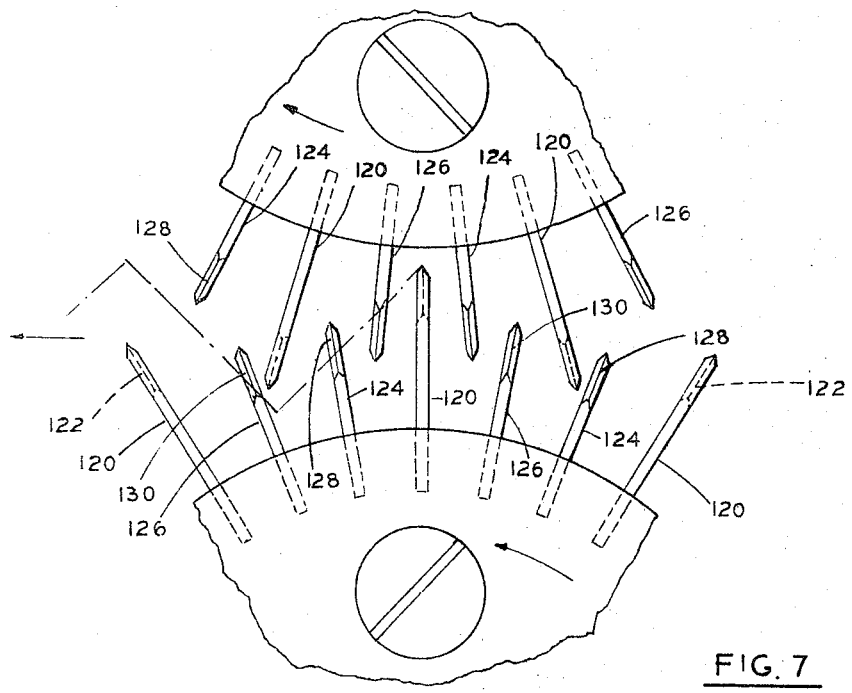
FIGURE 7 is a fragmentary greatly enlarged view of one end of the rolls and forming blades, at the ends which form the large corrugations.

Referring to FIGURE 1, there is shown a filter unit comprising a deep open ended frame 20 comprising top and bottom members 22 and 24, and side members 26 and 28, within which is a filter core, generally indicated at 30. The core comprises a continuous sheet of filter paper or media, of a width corresponding to the distance between the top and bottom members 22 and 24. The filter media is formed into pleats extending crosswise of the frame, the alternate pleat folds on one side of the frame being indicated at 32, and on the other side at 34. Intermediate the successive folds 32 and 34, are relatively flat flank portions 36 of the filter media.

Inserted between each pair of adjacent flanks 36 are corrugated separators 38 and 39. Each separator comprises a thin sheet of relatively stiff thin cardboard, plastic, sheet aluminum or the like, the corrugations of which at one end, as at 40, are larger than the corrugations 42 at the other end, the latter corrugations 42, for the purpose of illustration, being three in number for each corrugation 40, and being of a depth and width one third that of the corrugation 40. While a ratio of 3 to 1 has been selected as desirable, a greater ratio may be employed, should it be desired to provide a separator exhibiting a greater taper effect. The ratio however will desirably be such as to provide an odd number of small corrugations for each large corrugation for reasons as may appear hereinafter in connection with the formation of such separators.

As may be seen from FIGURE 4, each separator transforms from large corrugations 40 at one end, to a multiplicity of corrugations 42, such as three for each large corrugation at the other end. The flanks 44 and 46 of each large corrugation at one end, are sub-divided into three elongated panel like sections. The flank 44, for example is sub-divided into sections 50, 52 and 54, defined by lengthwise creases or fold lines 56 and 58, extending from the small corrugation end 42 toward the large corrugation end 40. The intermediate panel section 52, will be seen to take an approximate 90 degree twist along its length. Such twist may be accommodated by a slight distortion of the adjacent panels 50 and 54, which otherwise are relatively flat along their entire length or by such distortion and upsetting of the material as may occur in formation. While the width of the panel like sections may be uniform and each of equal width, it will be understood that slight variation may be employed as desired in order to minimize any distortion that might present itself in the central transition zone intermediate the ends of the corrugations. Similarly the flank 48 is subdivided into three panels 51, 53 and 55, by fold lines 57 and 59. It will be seen that by selecting a ratio of 3 to 1, or some other odd number ratio between the number of small corrugations, and large corrugations, the peaks of the large corrugations such as 60 and 62 may also be peaks of certain of the small corrugations, the fold lines of such peaks extending continuously from one end of the separator to the other.

In building up a pack or core 30 for placement in the filter frame 20, a long sheet of filter paper is successively formed into a series of pleats, and on the formation of each pleat, a separator is located between adjacent flanks of the pleat, the separators 38 and 39 being alternately oppositely oriented between the adjacent flanks 36 of filter media extending from each fold. Thus alternate separators such as 38 will have their large open end corrugations adapted to receive gaseous medium for flow into the pack, while the large open ends of the intervening separators 39 will be adapted to discharge filtered medium from the pack on the opposite side thereof. When a pack or core of the desired number of pleats has been prepared with separators disposed in the manner described, the core is inserted into a frame such as 20, and the sinusoidal edges of the filter media pleats and the opposite ends of the filter media sheet will be adhesively sealed to the frame, as at 68 and 70 respectively, to effectively avoid leaks and the chance of gas bypassing the media. If desired such a pack may be employed in a filter of the type shown in Baldwin #2,884,091, with the core held in the frame by a compacted surrounding and sealing layer of fiberglass or the like, and the filter media may be of the type referred to in Stafford and Lee #2,507,827, or such other suitable filter paper as may be desired.

In order to prepare a multiplicity of corrugated separators economically and all of like corrugated configuration, sheet material in the form of rectangular blanks may be formed into the desired corrugated configuration referred to by utilizing spaced rolls geared together and having inter acting forming blades. One form of such apparatus is shown in FIGURES 5–8 inclusive. In FIGURE 5, there are shown spaced hollow mandrels 80 and 82 having end journals as at 84 and 86, and 88 and 90. Journal bearing blocks 92 and 94 may be adjusted to vary the spacing between mandrels, the bearing blocks being slidably disposed on columns such as 98 and 100 at either end, and the blocks being held rigidly in adjusted position by threaded abutment studs 96 in bridge members 102 affixed to and extending across the upper ends of the columns 98 and 100. The blocks 92 and 94 may be urged upwardly by heavy coil springs 97. The journals 84 and 86 may be extended and provided with mating pinions 102 and 104 of like diameter and tooth pitch, and the tooth shape may be such as to permit limited variation in spacing without introducing back lash. Any suitable means, such as a crank 105 with handle 103, or power means may be employed to drive the rolls.

Each of the rolls 80 and 82 have a plurality of slots 106 extending lengthwise along their peripheries, the slots of each roll being angularly spaced uniformly. Each of the slots have seated therein a forming blade. Such blades are held in position in their respective roll slots by annular end caps 108 having flanges 109 bearing upon the tapered shoulders 110 on opposite ends of the blades, the caps being drawn axially of the rolls by a plurality of screws such as 112 to securely hold the blades.

Every third blade such as 120 on one roll will have its forming edge 122 suitably inclined with respect to the roll axis to form the apices 60 of the large corrugations at one end, which apices extend to and become the apices of every third small corrugation at the other end. Intermediate each pair of blades 120 are two like blades 124 and 126, the forming edges 128 and 130 of which incline oppositely to the edges 122 of blades 120. The other roll will have like blades 120, with two blades 124 and 126 intervening between adjacent blades 120.

Figure 8:
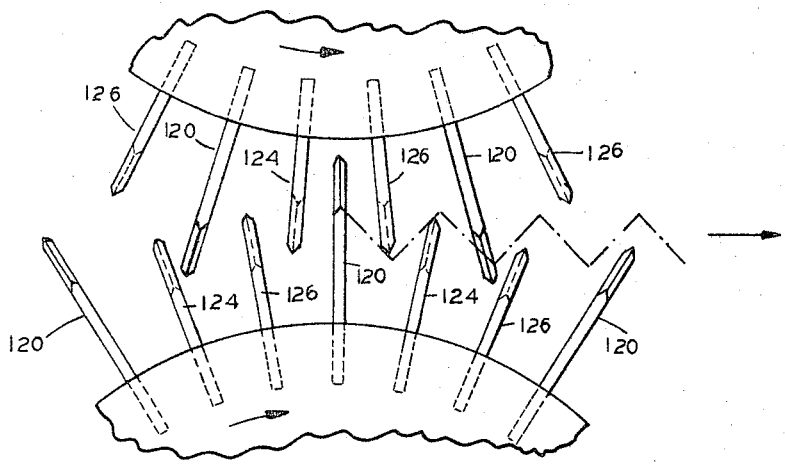
FIGURE 8 is a fragmentary enlarged view of the other end of the rolls and forming blades where the small corrugations are formed.

The roll 80 will be indexed in reference to the roll 82 such that the blades 120 of one roll are disposed exactly intermediate of the adjacent blades 120 of the other roll, as the blades approach interforming relationship, and all of the blades of one roll will be disposed exactly intermediate the adjacent blades of the other roll, when in interforming relationship. All of the forming blades will be of uniform height, at one end of the mandrels, as shown in FIGURE 8. The edges 122 of blades 120 of each roll, will gradually increase in height from the end shown in FIGURE 8 where the small corrugations are formed, to the height shown in FIGURE 7 where the large corrugations are formed. The forming edges 128 and 130 of the blades 124 and 126, will decrease in radial height gradually from the height at the end shown in FIGURE 8, where they are the same height as blades 120, the forming edges 128 and 130 gradually decreasing in height as they approach the end shown in FIGURE 7.

It will be seen that to form corrugated spacers of the type herein referred to, sheet material of the desired width may be passed between the forming blades of the respective rolls while being rotated preferably at a uniform velocity. The sheet material will thus be formed along the fold lines to provide the desired corrugation configuration. The separators may be formed from individual rectangular sheets initially cut to such size as will produce the desired separator size, or a continuous ribbon of sheet material may be fed through the forming blades, and cut to size after corrugation. Since the corrugation pattern will be uniform and precisely duplicated on all sheets, the formation of the filter pack may be effected with the corrugations of all spacers aligned and more particularly with the apices of the large corrugations aligned, so that any variation from a uniform taper of the successive separators, particularly in the mid portions, where the transformation from large corrugations to small for the most part occurs, may be offset by one another, and accommodated by the flanks of the filter paper departing slightly from planar configuration if such be necessary.

In order to illustrate the invention, considerable exaggeration as to size has been employed. In practice using a filter unit having a frame substantially 24 inches square with a depth approximately 12 inches deep, the separators may be such as to provide spacing between the adjacent flanks of filter media varying from nine thirty seconds of an inch from the open end to three thirty-seconds of an inch at the closed end. Such spacing provides line support of the filter media at the closed end at intervals three sixteenths of an inch apart, and thus substanially the entire area of the filter media is retained in an exposed condition, so as to be substantially 100% effective throughout the filter life.

While certain dimensions have been referred to, such reference has been made for illustrative purposes. It will also be understood that the separators may be formed by other means than the bladed forming rolls. It will also be appreciated that while a ratio of three to one has been referred to as the ratio between the number of corrugations at one end as compared to the number of corrugations at the other end, the concept is capable of variation, and is particularly susceptible of any ratio which may be expressed by an odd whole number.

Although a single embodiment of the invention including a specific type of forming apparatus has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Apparatus for forming corrugated spacing members for pleated filters, wherein the corrugations at one end are of greater amplitude and height than the corrugations at the other end, comprising a pair of spaced rolls mounted on substantially parallel axes, means for positively driving one roll from the other in a reverse direction, a plurality of uniformly spaced forming blades projecting radially from each roll into interforming relationship with the blades of the other roll, certain of said blades of each roll having a forming edge inclined with respect to the axis of the rolls in one direction, and being uniformly angularly spaced around the rolls, and the remaining blades being disposed intermediate of the first named blades and having forming edges oppositely inclined with respect to the axis of said rolls.

2. Apparatus in accordance with claim 1 wherein the total number of blades on each roll bears a ratio to the number of blades inclined in the one direction of an odd whole number.

3. Apparatus in accordance with claim 1 wherein the total number of blades on each roll bears a ratio of three to the number of blades inclined in the one direction.

No references cited.

EARL M. BERGERT, *Primary Examiner.*

J. P. MELOCHE, *Assistant Examiner.*